Oct. 26, 1971    R. E. PERRY    3,614,915
PANEL ASSEMBLY AND METHOD
Filed Jan. 21, 1969    6 Sheets-Sheet 4
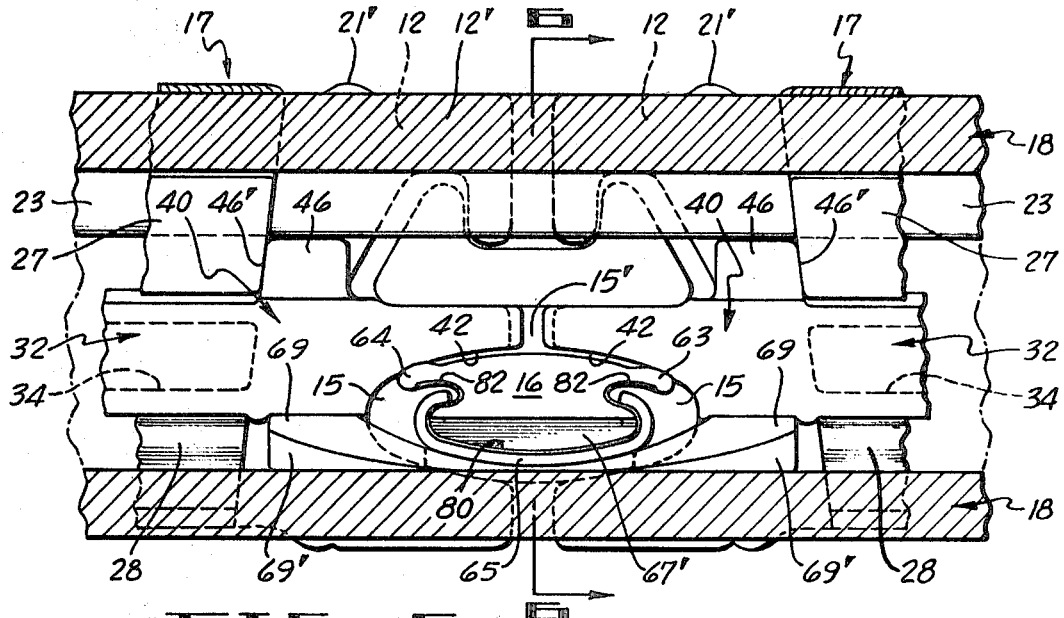
FIG_5
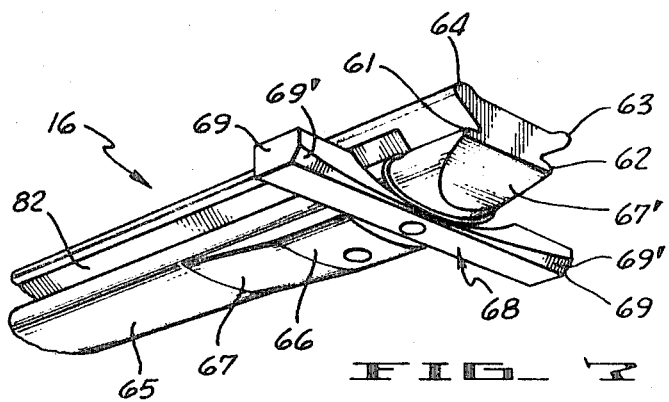
FIG_7
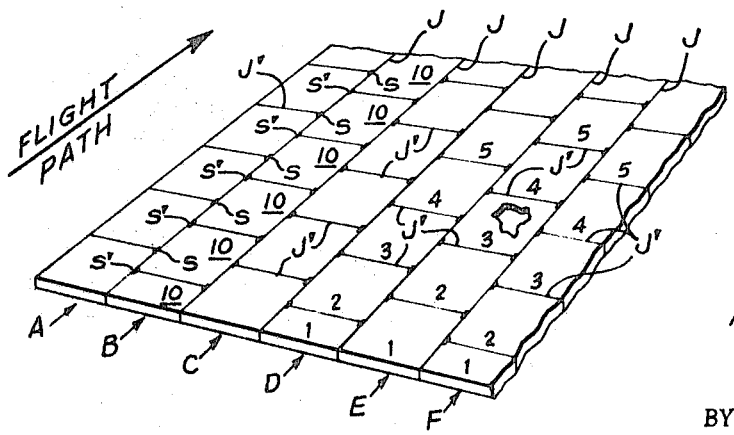
FIG_8
ROBERT E. PERRY
INVENTOR.
BY John S. Rhoades
ATTORNEY

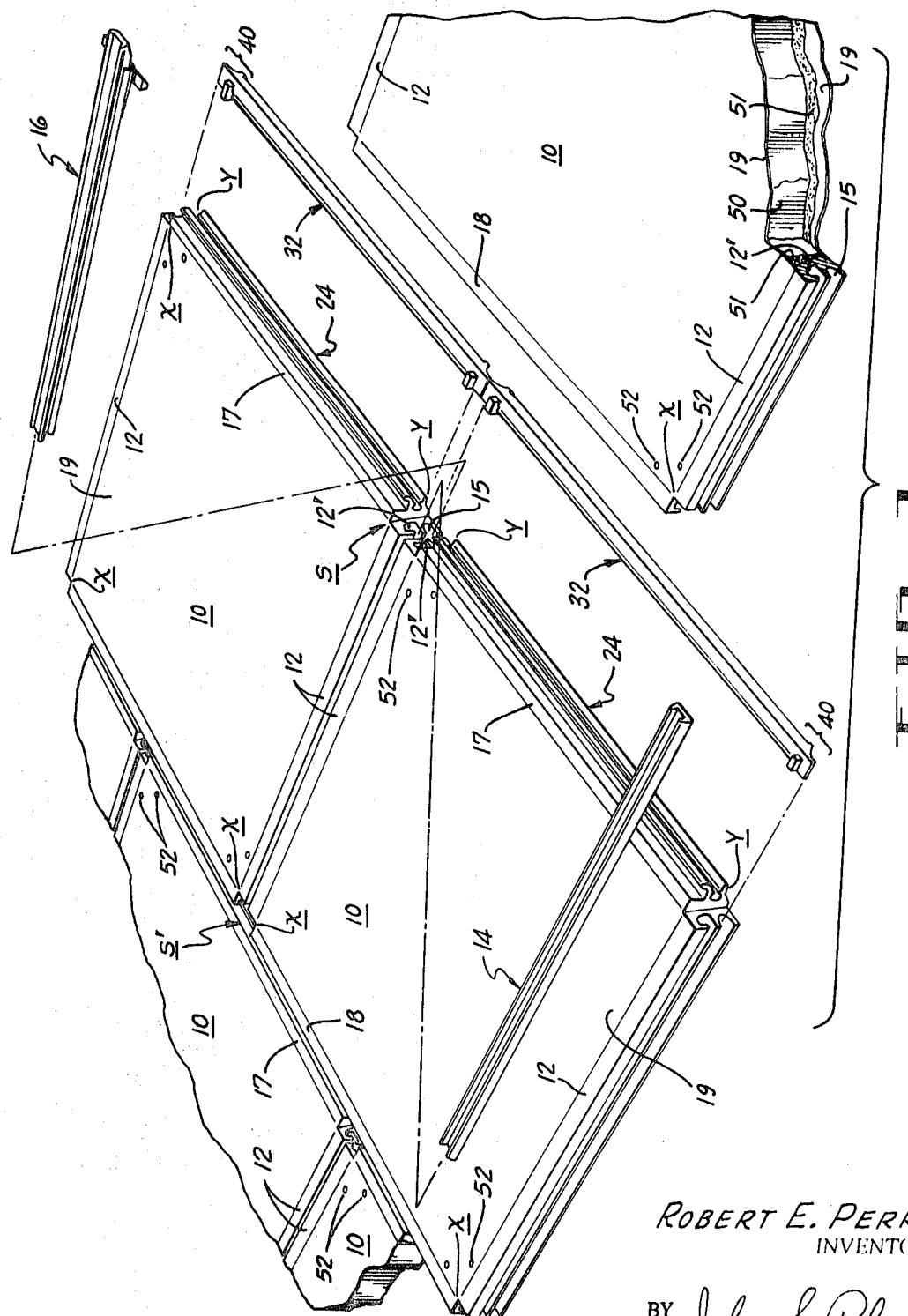
Oct. 26, 1971    R. E. PERRY    3,614,915
PANEL ASSEMBLY AND METHOD
Filed Jan. 21, 1969    6 Sheets-Sheet 1
ROBERT E. PERRY
INVENTOR.
BY John S. Rhoades
ATTORNEY

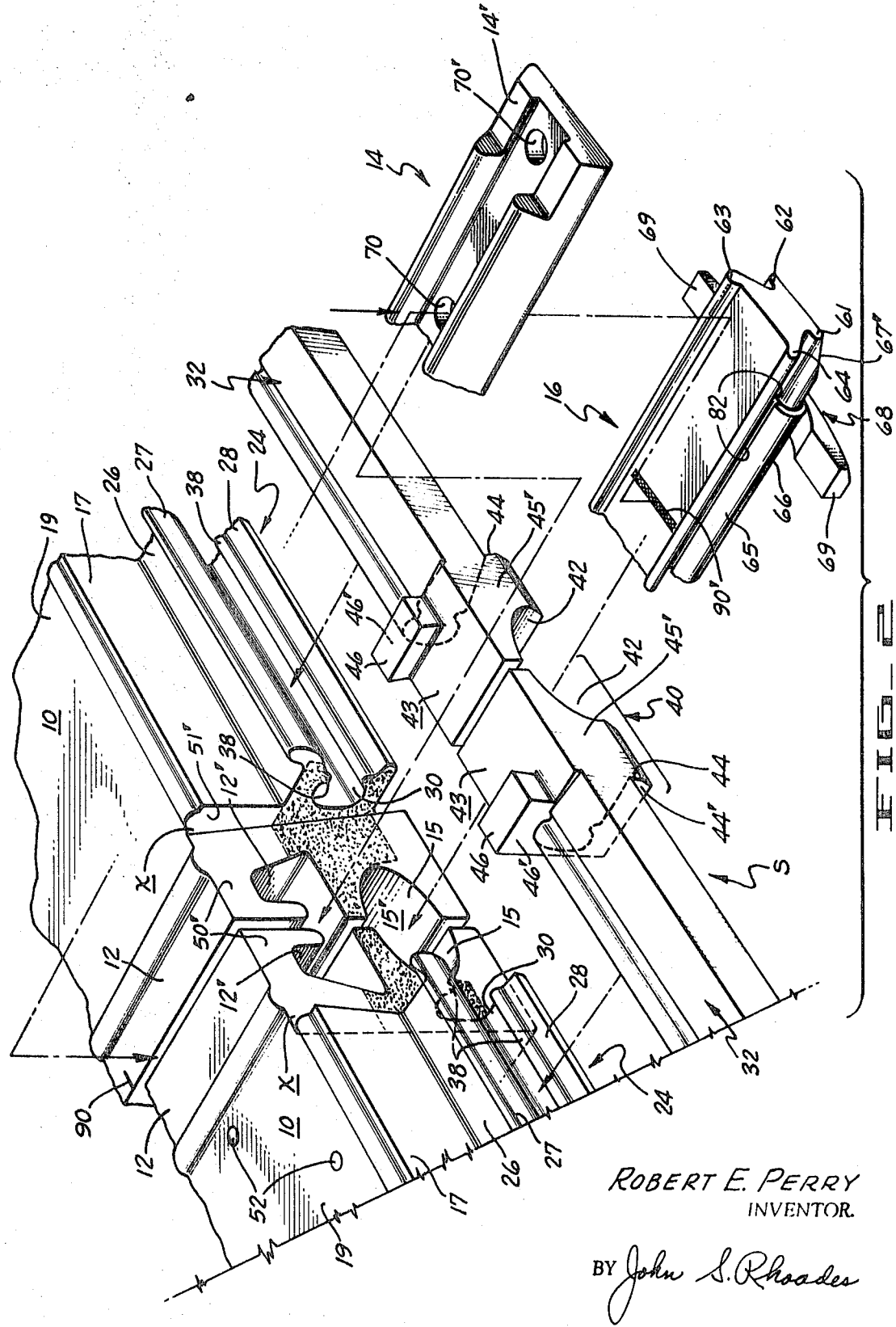

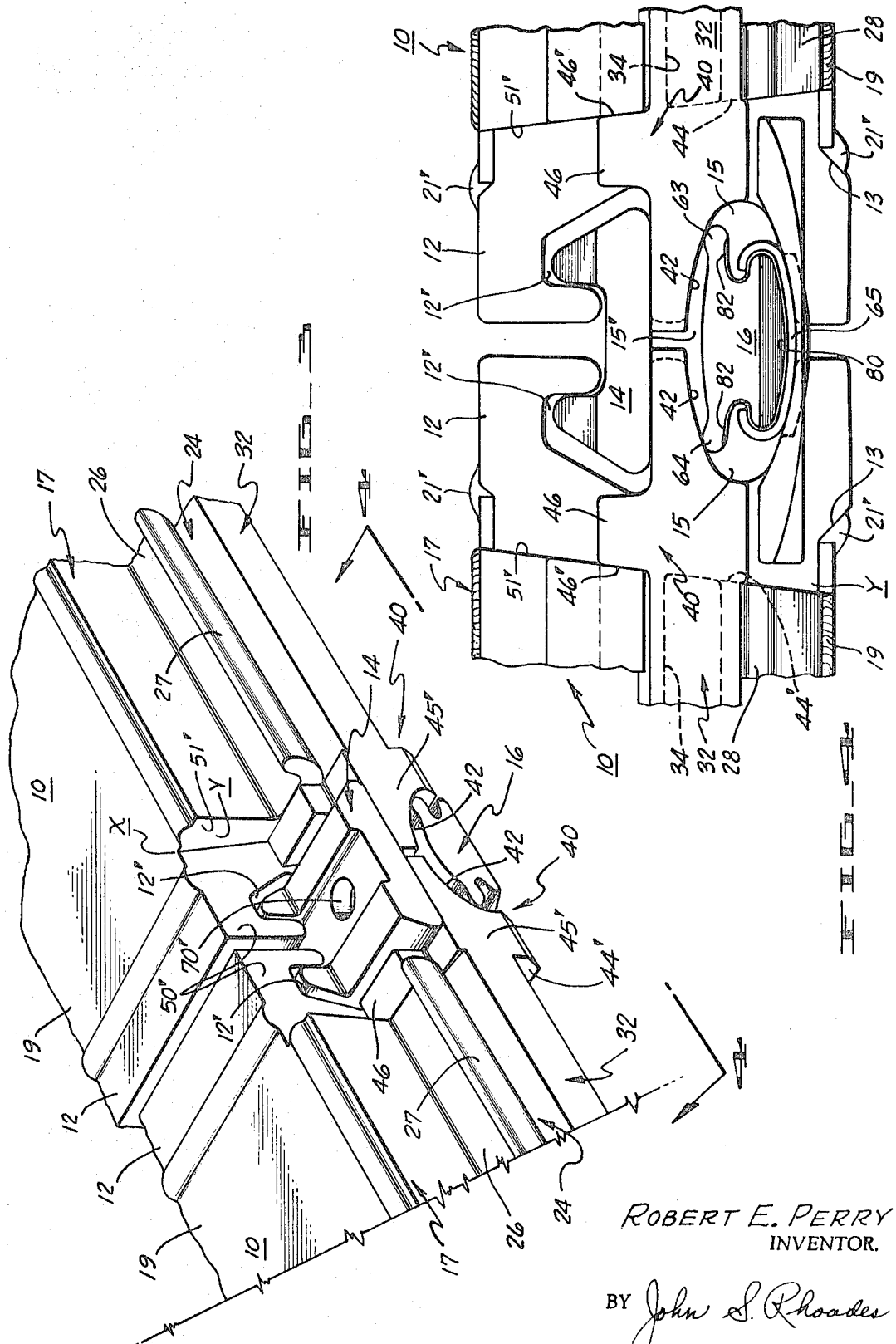

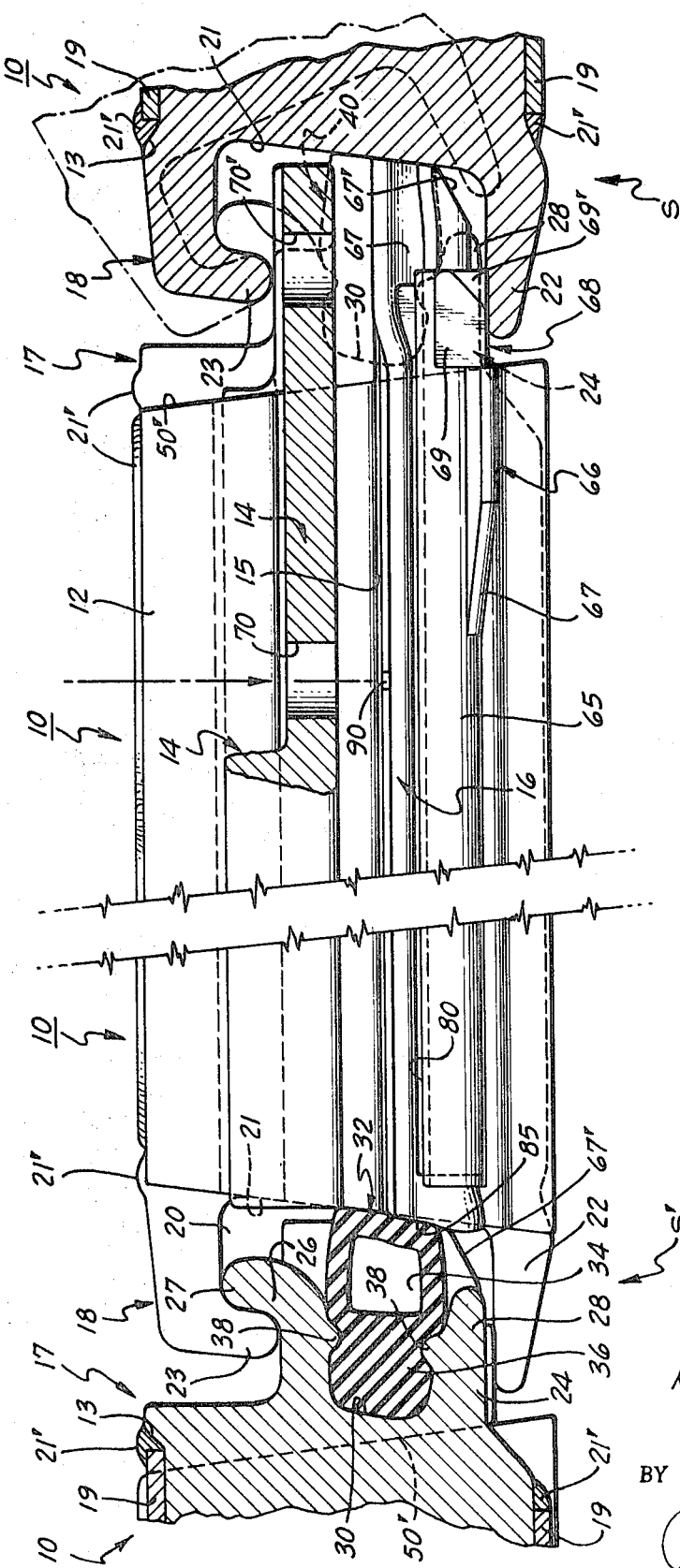

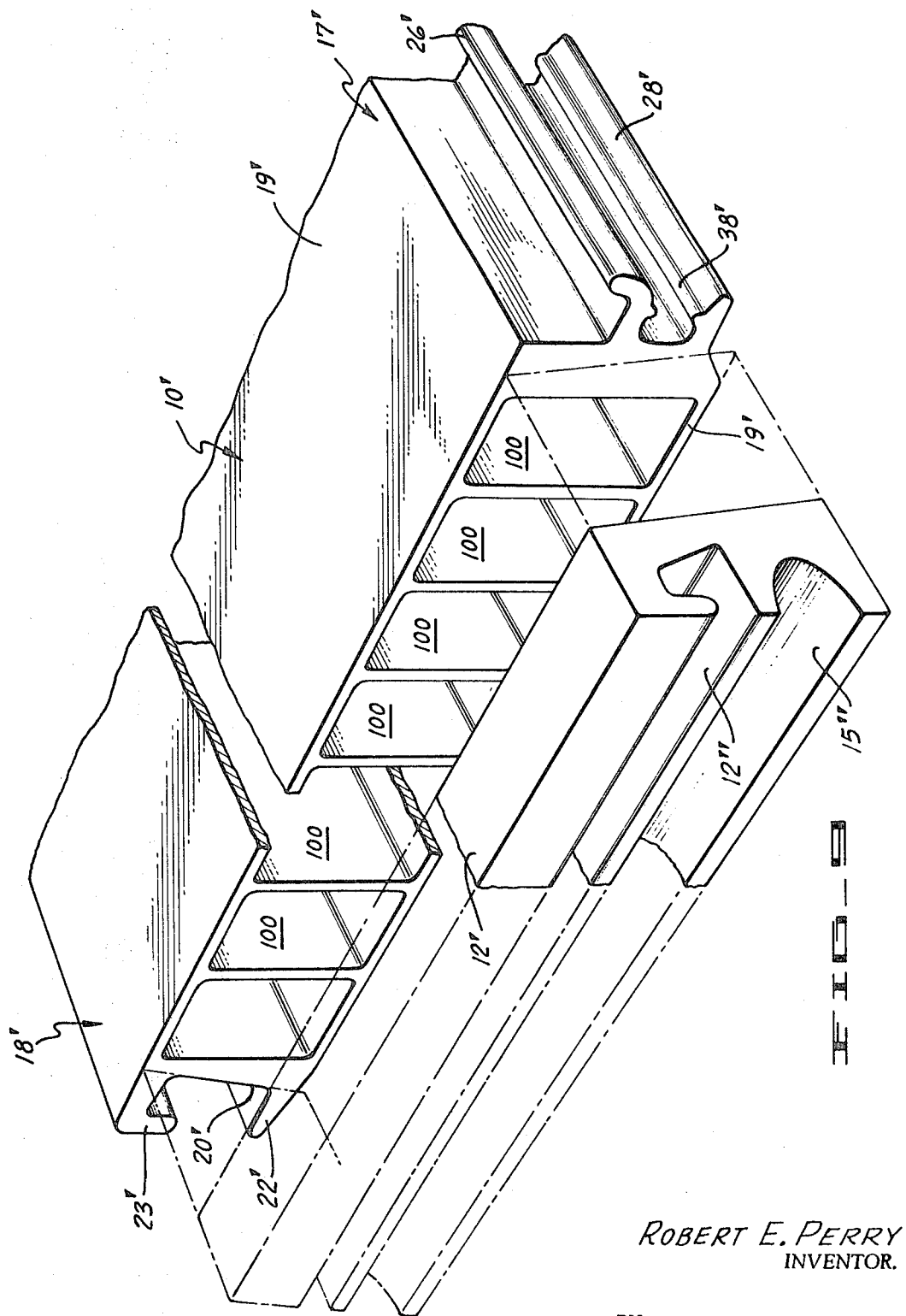

United States Patent Office 3,614,915
Patented Oct. 26, 1971

3,614,915
PANEL ASSEMBLY AND METHOD
Robert E. Perry, Lafayette, Calif., assignor to Kaiser Aluminum & Chemical Corporation, Oakland, Calif.
Continuation-in-part of application Ser. No. 767,447, Oct. 14, 1968. This application Jan. 21, 1969, Ser. No. 792,357
Int. Cl. E01c 5/00
U.S. Cl. 94—13
23 Claims

ABSTRACT OF THE DISCLOSURE

This invention relates to an improved load supporting and load transferring panel system for use in landing mat installations and the like comprised of a plurality of removably interlocked panels and wherein the joints formed by the various marginal edges of the interlocked panels are provided with improved cooperating locking and sealing means to prevent the penetration of water and the like through the joint structures as well as to facilitate installation of the overall panel system and access to individual panels that may become damaged in use.

DESCRIPTION OF THE INVENTION

This invention relates to a novel load supporting and load transferring panel system which constitutes an improvement over the panel or plank system disclosed in patent application Ser. No. 767,447, filed Oct. 14, 1968, and is directed to improved means for sealing the individual panels to each other particularly at the various pocketed joint structures that are formed at common points of mergence of a given plurality of panels. This application is also a continuation-in-part of said application Ser. No. 767,447, filed Oct. 14, 1968. The sealing arrangement proposed herein is such that it effectively inhibits the penetration of water through the joint structures. In prior art landing mat systems, such as those represented by U.S. Pats. 3,172,508, 3,301,147, 3,348,459, and 3,858,183, serious problems were encountered in the initial installation, use and, in particular, the overall maintenance of these systems due to the penetration of water through the joints resulting from the assembly of the various panels or plank members used in these systems.

In prior art landing mat installations, wherein no sealing arrangements were used, rain water penetrated the cracks or openings in the joints between the panels making up the mat sections and settled in pockets under the mat sections or planks. Because of this water penetration through the matting, the loads applied to the matting by aircraft passing across the same created a hydraulic or pumping action. This pumping action resulted in soil being forced out from under the matting and through the unsealed matting joints thereby leaving sink holes or depressions underneath the matting adjacent the joint structures. This soil erosion and pump-through action that was initiated during one rain became aggravated upon subsequent rains in that the sink holes got progressively larger, more water collected in the enlarged sink holes and more soil was pumped through the joints due to air traffic until, in a relatively short time, the landing mat system became unfit for use until the matting was disassembled and all of the sink holes had been filled with earth or the substrate otherwise leveled.

This problem of preventing water from penetrating through the surface of the matting to the subsoil and which is particularly acute in areas of the matting where a series of panels meet to form a common joint, has been further aggravated or complicated by the requirements that the marginal edges of the matting, panels or planks be of such design that they could be easily emplaced initially and easily replaced while, at the same time, be capable of effectively and efficiently transferring loads from one to the other. The panels also had to be locked together in such fashion that they would remain interlocked despite the normal expected thermal expansion and contraction of the panels relative to each other and to the substrate at the installation site.

SUMMARY OF THE INVENTION

This invention in general relates to an improved overall sealed joint structure for all of the joints in a modular panel or plank system used particularly in demountable landing mat installations. The sealing system that is employed includes, among other things, a unique arrangement and interengagement of sealing elements in the various pocketed joint structures formed at the intersection or point of mergence of several panels, such as at a pocketed joint structure formed by three panels in the overall landing mat system or installation.

BRIEF DESCRIPTION OF THE DRAWINGS

The various advantageous features of the instant invention will be further understood and appreciated by reference to the following drawings wherein:

FIG. 1 is a partially perspective and partially exploded view of a preferred embodiment of the matting assembly of the instant invention and the components making up the same;

FIG. 2 is a fragmentary exploded view of the various components used to form a sealed three-way joint of the instant invention;

FIG. 3 is a fragmentary perspective view of a sealed three-way joint assembly formed by the disassembled elements illustrated in FIG. 2;

FIG. 4 is a view taken generally along line 4—4 of FIG. 3;

FIG. 5 is a view similar to FIG. 4 with parts added;

FIG. 6 is a broken sectional view taken generally along line 6—6 of FIG. 5;

FIG. 7 is a partial perspective view of what may be referred to as a transition joint sealing strip element of the instant invention;

FIG. 8 is an overall schematic view of a typical landing mat installation incorporating the improved joint sealing arrangement of the instant invention; and FIG. 9 is a broken perspective view of a modified type of panel that can be used in practicing the instant invention.

DETAILED DESCRIPTION

With further reference to the drawings, the improved joint sealing arrangement or system of the instant invention can be used with loading bearing sandwich type modular panels of the type shown in FIGS. 1–6, with fully extruded aluminum or aluminum alloy sections of the type show in FIG. 9, or with other panels of similar design. The invention will be particularly described, however, with reference to the sandwich type load bearing panels and wherein the various marginal edges of the plank comprise light metal extrusions appropriately secured together or roll formed elements. Metal facings are secured to these extrusions to form the top and bottom of the plank or panel and a honeycomb core element or the like is disposed within and fills the interior of the panel while being anchored to the extruded sides and top and bottom facings.

The modular panel elements shown in FIGS. 1–6 generally comprise a many sided panel 10 which is preferably either of a square or rectangular configuration. When a plurality of these modular panels are interlocked together, they can form a landing mat installation of the type illustrated in FIG. 8 wherein the panels are preferably arranged in a chevron fashion or staggered relationship with respect to one another along certain of their sealed marginal edges.

In a preferred embodiment of the invention, each of the panels 10 is provided with a pair of transition joint connector elements 12 that can be made as indicated in the drawings in the form of light metal extruded sections located on opposite marginal edges of the panel. The term transition joint as used herein refers to the panel joints which include a load transferring locking bar 14 for use in interlocking adjacent panels together and for transferring the loads from one panel to another. These joints are preferably located at an angle to the normal flight path in the finished mat installation. Since each of these elements 12 has the same configuration, a description of one will suffice for both. The upper portion of an extruded element 12 is provided with an inwardly and upwardly disposed recess 12' which is adapted to receive a portion of a load transferring locking bar 14 that is generally U-shaped in cross-section. The lower portion of the connector 12 is provided with an outwardly opening recess 15 that can roughly simulate one-half of an ellipse in cross-sectional configuration. When two of these connector elements 12 are disposed in opposed relationship to one another during emplacement of one panel 10 along side a similar panel 10, they are adapted to receive a sealing element 16 to be subsequently described in detail within the overall elliptical recess 15' formed by recesses 15 on the opposed connectors 12.

The other two remaining marginal edges of the plank or panel 10 are made up of male and female compression joint connector elements 17 and 18 respectively. The term compression joint as used herein refers to joints between panel elements wherein the panels are interlockable without the use of an intermediate locking bar and wherein the joints are preferably arranged parallel to the normal flight pattern in the final mating assemblage. Male and female connectors 17 and 18 can likewise be advantageously made from light metal extrusions.

Female connector element 18 is generally provided with a channel-like opening or mouth 20 bounded or defined by a rear wall portion 21 and a lower shelf portion 22 that is opposed by an upper turned-in finger portion 23. The male connector 17 which is adapted to be received within the mouth 20 of a female connector 18 is, as indicated in FIGS. 1 and 6, provided with a bifurcated or forked tongue section 24 that is adapted to be inserted in the recess 20 of the female connector element. Bifurcated section 24 includes an upper prong 26 having an upturned finger portion 27 which is interengageable with the inturned finger 23 on the female connector 18 of an opposing panel 10. Finger 27 can be used as a pivot for the female connector 18 of an opposing panel when the opposing panel is rolled or pivoted into position in the fashion shown in dotted lines in the right hand portion of FIG. 6. Bifurcated tongue 24 further includes a lower prong 28 which is adapted to slide over and come to rest above the shelf 22 of the female member 18 when the portions of opposing panels 10 provided with these male and female connectors are fully mated with each other.

As indicated in my prior application Ser. No. 767,447, when the panels 10 are fabricated as a sandwich and include the extruded connector elements 12, 17 and 18. the top and bottom of connectors 12 and at least the tops of connectors 17 and 18 are provided with appropriate stepped portions 13 for receiving the upper end lower deck facings or plates 19 which are in turn fixedly secured to the connector members 12, 17 and 18 by the fillet weldments 21'. In making up these sandwich panels, it is the general practice after the various extruded members 12, 17 and 18 of a panel 10 have been suitably welded together at their adjoining ends or at the panel corners in the areas X as well as to the bottom plate or facing 19 to dispose and anchor a honeycomb core structure 50, see FIG. 1, made of aluminum foil or the like within the pan formed by the bottom facing 19 and extruded side elements 12, 17 and 18. This core 50 is then anchored to the bottom plate 19 and to the connector elements 12, 17 and 18 by suitable epoxy resinous materials 51 or the like. Thereafter, the top plate or facing 19 is attached to the side elements 12, 17 and 18 by weldments 21' in the same fashion as bottom facing 19 is anchored to the same members. After top facing 19 is in place, holes or openings 52 in this top facing plate 19 can be used to inject additional resinous adhesive material or adhesive grout into the interior of the panels, if desired, for the purpose of completing the adhesive affixation of core 50 to facings 19 and elements 12, 17 and 18.

As indicated previously, in lieu of using a sandwich type panel of the type described, a fully extruded panel or plank 10' can be used in practicing the invention. As indicated in FIG. 9, wherein like parts of panel 10 of FIGS. 1 and 6 have been identified by like but prime or double prime reference numerals, the male and female connector elements 17' and 18' are integrally formed with the overall panel during extrusion of the same. Thereafter, separately extruded connector elements 12' are appropriately welded to the open ends of the panel 10' which includes top and bottom deck plates 19' joined together by spaced and integrally formed interior ribs or walls 100. Conversely, if connector elements 12' are formed during extrusion of the panel as integral parts thereof, then connectors 17' and 18' would be made as separately extruded elements and suitably welded to the open ends of panel 10' instead of elements 12'. The sealing and connecting system for panels 10' would, however, be the same as that for panels 10, all of which is to be described hereinafter.

With further reference to FIGS. 1-6, the prongs 26 and 28 of male connector 17 are separated by a recess 30 within which sealing strip 32 of an appropriate resilient and compressible material is inserted or lodged. Sealing strip 32 can, if desired, be manufactured in such a fashion, such as by being made of a suitable grade of extruded rubber, rubber-like, or plastic material whereby it is provided with a hollow interior 34 for the greater portion of its length. In overall cross-sectional configuration, strip 32 can be somewhat arrow-shaped whereby it has a slightly grooved intermediate waist portion 36, which is adapted to be engaged by the teeth or splines 38 on the male connector element 17 when strip 32 is inserted in the groove 30 of the male connector.

The sealing strip 32, as indicated particularly in FIGS. 1 and 2, is advantageously provided with enlarged end sections or heads 40 which can be integrally formed with the remainder of strip 32 when the strip 32 is not provided with a hollow interior 34. When strip 32 provided with a hollow interior 34 and is made of a rubber or rubber-like material or the like, heads 40 can be also made of similar rubber or rubber-like material or the like and vulcanized onto or suitably joined the to open ends of strip 32. The lower portions of the front edges of the leading edge of head sections 40 are arcuately cut away at 42. When the arcuately grooved portions of opposing end strips 32 are drawn together as indicated in FIGS. 2-5, they, in effect, act to form an arched recess and a continuation of the top of overall recess 15' in connector elements 12 at the three-way joint or panel merger arrangement shown in these figures of the drawings for receiving the sealing strip 16 which is arranged crosswise or at an angle to the sealing strips 32 in a manner to be subsequently described. Head sections 40 further include a shoulder element 44 at the inner bottom portions thereof and a stop element 46 projecting from the top thereof. The various transition joint walls 44' and 46' respectively of shoulder 44 and stop 46 and the compression joint walls 45' of head 40 are all advantageously inclined as shown in FIGS. 2 and 5 and 6 whereby the heads 40 will engage correspondingly inclined surfaces on the various elements 12, 17, 18 that contact such walls. The manner in which the aforesaid walls on heads 40 contact the associated inclined surfaces on elements 12, 17 and 18 is somewhat outlined in FIG. 2.

With further reference to the drawings and in particular FIGS. 1 and 7, it will be observed that the elongated sealing strip 16 which is adapted to be inserted in the mating openings 15 of opposed connector elements 12, when adjacent panels provided with connectors 12 are brought together, is in a preferred embodiment of the invention somewhat H-shape in cross-section. In contrast to strip 32, which is usually carried in its associated male member 17 at all times, strip 16 remains a disconnected or out of place member until two panels 10 are adjoined and overall opening 15' formed therebetween. Strip 16, as in the case of strip 32, is also made of resilient, compressible material such as a suitable grade of rubber or rubber-like material of the appropriate durometer or hardness, or any other appropriate plastic material such as neoprene which has sufficient resilience and compressibility that it can be appropriately compressed within the overall opening 15' formed by the mating oval shaped grooves 15 of opposing connector elements 12.

Sealing strip element 16 includes a bottom portion provided with lower opposed legs or wing elements 61 and 62 and opposed top legs or wing elements 63 and 64. In order to give some preselected compression to the sealing strip 16 and for additional reasons to be discussed hereinafter, the lower portion thereof can be jacketed for the major portion of its length with a metallic sleeve or cap 65 such as one made of stainless steel, aluminum or like material. Cap 65 is roughly channel-shaped and can be clamped or drawn about the lower wing portions 61 and 62 of cap 65 so as to cause the cap to bulge slightly upwardly at the top thereof in the manner indicated, for example, in FIGS. 3 and 4. If desired, and as indicated in FIGS. 4 and 6, an intermediate thin metal sleeve 80 of spring steel or the like can be sandwiched in between sealing strip 16 and cap 65 for reasons to be discussed hereinafter.

Suitably affixed to one end of cap 65 is a wedge element 66 which is provided with a tapered or chamfered end portion 67 that is spaced inwardly of the free extremity of that portion of the sealing strip 16 to which wedge element 66 is attached. Also secured to the cap 65 adjacent the non-tapered end of the wedge element 66 is a bridging or stop element 68. The free edge of the extremity of the sealing strip 16 to which the wedge element 66 is attached is also chamfered as at 67' and the wings 69 of stop 68 are also advantageously chamfered as at 69'.

The arrangement for assembling the various panels 10 or 10' as the case may be so that substantially continuous seals will be provided for the full length of the compression and transition joints of the matting will now be described. As indicated above, prior to assembly of panels 10 in a matting installation, it is to be understood that all of the sealing strips or plugs 32 will normally be in place within the openings 30 of their associated male members 17. Strips or plugs 32 fit snugly within openings 30 in such fashion that the enlarged head portions 40 thereof protrude into the triangular pockets Y formed by the adjoining ends of the connector elements 12 and 17 at two corners of a panel 10. Thus the cut-away sections 42 of a pair of matching heads 40 can form a continuation of the top of overall groove 15' of any given pair of adjoined connector elements 12. The sides 45' of heads 40 are advantageously inclined or tapered during their manufacture at substantially the same inclined angles as the exposed edges of connectors 12 and walls 21 of grooves 20 of members 18 which they are to abut in the final joint structure of FIGS. 3-5. The back wall 46' of stop 46 which can extend for the full width of strip 32, if desired, and the back wall 44' of shoulder 44 are likewise advantageously at substantially the same inclined angles as the free edges of their associated male connectors 17 which they are to abut in the aforesaid final joint structure. By virtue of the aforesaid tapering of various portions of heads 40, the heads 40 will advantageously wedgingly and sealingly fill the final overall pocket areas in the fashion shown in shading in FIG. 2 and be in snug engagement within all their associated connector elements 12, 17 and 18 in the final matting assembly all as indicated in FIGS. 3 and 6.

When, as indicated in FIG. 8, a series of strips 32 are emplaced end to end along with their associated panels, they act to seal one of the many parallel and substantially continuous compression joints J in the overall matting system while the strips 16 advantageously act to seal the discontinuous and staggered transition joints J' arranged generally cross-wise to the compression joints J. When composite strips 16 are sealed to strips 32, seals also exist between these compression and transition joint sealing elements. In other words, all of the longitudinal and lateral joints or mat seams are substantially continuously sealed to each other in the overall matting system of the instant invention so that a relatively water impervious landing mat installation is provided. It is to be understood, of course, that suitable drainage ditches or the like can be dug adjacent the instant sealed landing mat installation for the purpose of carrying off the water that collects on the mats and flows off of the same. In a preferred embodiment of the invention, the compression joints J are located so as to parallel the normal air traffic pattern in the landing mat installation while the transition joints J' are arranged transverse to the normal air traffic pattern. Due to the unique joint sealing system and structure of the various elements used therein, little difficulty is encountered in installing the individual panels or mats 10 in the panel arrangement of FIG. 8.

In one preferred system of mat installation of the type indicated in FIG. 8, a series of panels 10 with sealing strips 32 attached are first laid end to end in a continuous row such as row A starting from the left of FIG. 8 and with the connectors 12 of adjoining panels being disposed in opposed relation, as close to one another as possible, and with their male connectors 17 exposed. Suitable tools can be used for drawing adjacent panels together if desirable.

Thereafter, a separate sealing strip 16 is manually inserted in each of the overall openings 15' formed by opposed connectors 12 in each of the transition joints J' formed in row A. In one method of installation, since a slight gap exists between each of a given set of opposed connectors 12 and since the bottom of the strip 16 is advantageously metallized by virtue of the metal sleeve or cap 65 which acts to reduce the friction between the walls of openings 15 of connectors 12 and strip 16, the strips 16 can be readily slid endwise into place or to the left as viewed in FIGS. 1-3 and 8. If desired, the walls 15 of connectors 12 can be coated with a suitable lubricant to facilitate the sliding of strips 16 in transition joint openings 15'. As the wedge element 66 attached to a strip 16 passes over the bottom walls of the recesses 15 in a given set of connectors 12, it will tend to force the end portion of strip 16 to which the wedge 66 is attached into forceful engagement with heads 40 of strips 32 and the upper legs 63 and 64 of strip 16 into forceful contact with the upper walls of recesses 15 in connector elements adjacent the one end of the strip 16 provided with the wedge element 66. The endwise movement of strip 16 can continue until the winged stop 68 thereof abuts the inclined walls of elements 12 in the triangular pockets Y in the manner shown particularly in FIG. 6. Suitable tools can also be used to move strip 16 into place, if necessary or desired.

After each individual sealing strip 16 is emplaced as aforedescribed, a preferred embodiment of the invention contemplates that the locking bar 14 for each transition joint J' containing an emplaced strip 16 be first emplaced before the next succeeding strip 16 is emplaced. The locking bar 14 is slid or forced endwise and to the left as viewed in FIGS. 1 and 8 and through openings 12' in opposed connectors 12 by the aid of a suitable tool, if necessary. Since an emplaced strip 16 by virtue of its resilient characteristics and despite any initial partial compression thereof tends to force elements 12 apart the counteracting action of bar 14 when emplaced will act to hold the strip in compressed condition with the strip retaining the desired compressed configuration shown in FIG. 5 wherein the upper wings or legs 63 and 64 are flattened and sealed against the upper walls of recesses 15 of opposed connector members 12. The overall result of the interaction of bar 14 and strip 16 is that the spring back or resiliency of strip 16 tends to force members 12 apart and into firm interlocking engagement with bar 14 so that bar 14 can effectively perform its function of transferring loads from one of its associated elements 12 to its other associated element 12 during use of the matting. The arms 82 of metal strip 80 disposed intermediate strip 16 and cap 65 advantageously act as springs to prevent undesirable collapse of legs 63 and 64 of strip 16 and to urge and force these legs into sealing engagement with walls 15 in elements 12 under all the varying conditions of matting installation and use.

In addition, since the locking bar 14 is of such a length as to protrude into the pockets Y formed at the one type of three-way joint structure or point of mergence S of the panels, it will tend to exert a downward compressive force upon the heads 40 of sealing elements 32 in the pockets Y at the joint S with this force then being transferred to the sealing elements 16 sandwiched between cap 65 and heads 40. This downward compressive force from bar 14 is resisted by the metal cap 65 of the sealing strip which bears partially against the lower walls of openings 15 and extends in cantilever fashion into the three-way joint S of FIGS. 2–5 and in the manner shown in the right hand portion of FIG. 6 and thus prevents undesirable collapse of strip 16 in its relatively unsupported but critical sealing position in the aforesaid three-way joint S. Also, as indicated at the right hand joint of FIG. 6, the wedge 66 for strip 16 acts to further compress and force strip 16 in the area of the joint S slightly upwardly to further compress the sandwiched heads 40 of strips 32. This compression and flattening of heads 40 tends to force the heads 40 outwardly and into firm abutting engagement with the various associated walls of elements 12, 17 and 18 in the final joint structure J during the varying conditions of mat installation and use.

After all of the panels in row A are emplaced and sealed together as described, a second row of panels, such as those of row B of FIG. 8, are installed by simply rolling the tongues 23 of the female members 18 on the various panels making up row B in fulcrum fashion about the fingers 27 on the exposed male members 17 of the in-place panels 10 in row A in the manner indicated in dotted lines in the right hand portion of FIG. 6.

As the female members 18 are pivoted downwardly and rolled into place, the shelf portion 22 of the various female members advantageously slides or slips under the protruding end of the strip 16 while clearing the winged stop 68 secured thereto until the stop 68 comes to rest on shelf portion 22. The panels of row B are advantageously offset relative to the panels of row A so that alternate three-way joints or points of panel mergence S' are formed in conjunction with joints S in the various transition joints between the panels of rows A and B. In order to achieve the offsetting of panels in rows A and B, the lowermost or starting panel in row B is advantageously foreshortened. By virtue of this arrangement, the corners of only three panels will advantageously meet at any of the joints S or S' so that the problems of sealing these joints at the points of mergence of a plurality of panels 10 are further minimized.

After the female members 18 of the panels 10 in row B are rolled into place and the sealing strips 16 inserted and located in the transition joints J' in row B, compression of the main body portions of sealing elements 32 will take place in the manner shown in the left hand portion of FIG. 6 in the areas of points of panel mergence S' in the overall compression joint J between the panels in rows A and B as the free ends 85 of strips 16 are appropriately compressed against the main body portions of strips 32. This compressive contact between the free ends 85 of strips 16 and the main body portions of strips 32 produces effective seals in joints S' as well as joints S in the overall matting installation. The portions of strips 32 outside the areas of joints S and S' are sealably compressed against the associated bifurcated tongues 24 of members 17 and the back walls 21 of the openings 20 in elements 18 when members 18 are locked to their associated members 17.

In order to facilitate the rolling of the female members 18 of row B about the male members of row A, a preferred embodiment of the invention contemplates that the extremity of the sealing element 16 that fits within a joint S be chamfered as at 67' and that the wings 69 of the stop elements 68 also be somewhat chamfered as at 69'. Since the ends of the locking bars 14 protrude a slight distance into the overall joints S, the tops of these bars are cut away in the form of a step 14 to prevent the bars from offering any obstruction to the downwardly turned lips 23 of the female members 18 as the latter members are rolled about and into contact with the upwardy projecting fingers 27 of the bifurcated tongues 24 of the male member 17. Bars 14 can be made sufficiently long whereby they will protrude slightly into the joints S' so as to aid in compressing element 32 in the areas of joints S'.

In an advantageous embodiment of the invention, the elements 12 can be provided with strip 16 locating marks 90 and the elongated sealing strip 16 can be provided with a matching location mark 90' on the top and adjacent the end thereof provided with the wedge element 66. Mark 90' is visible in the small crack or opening between connector elements 12 when sealing strip 16 is located in its final position between elements 12. When marks 90 and 90' are matched as viewed through opening 70 in the lock bar 14, the mat installer will know that the top element 68 is snug up against elements 12 in a joint S. When the opening 70 of a locking bar 14 is aligned with mark 90', on a strip 16, the installer will also know that the free extremity of the locking bar 14 is approximately disposed within the overall pocket that is formed between the connector elements 12—12 forming a given joint S. The other opening 70' in the shoulder portion of a bar 14 can be engaged by a tool for the purpose of installing or removing the bar. As noted above, the elongated sealing strip 16 is made longer than the connector members 12 with which it is to be associated in the final matting installation whereby its uncapped end 85 can contact and be appropriataely sealably compressed against a sealing strip 32 mounted crosswise thereto in a joint S' as above noted while its other winged end is compressed against the back wall 21 of a female member 18 in a joint S. The aforesaid registry of marks 90 and 90' can also be used to indicate to matting installers that the uncapped end 85 of strip 16 is properly sealed to a strip 32. Successive rows C, D, E and F, etc. of panels 10 are installed in the same fashion as noted above until the entire matting installation is completed.

In all of the joint structures formed in the instant matting system, the various connector elements 12, 17 and 18 are effectively sealed to each other including the areas of the matting formed by the points of panel mergence or the three-way joints S and S'. The particular joint sealing arrangement proposed permits the various panels in the same or adjacent rows to shift relative to one another without breaking the seal therebetween particularly in the areas of joints S and S'. This is significant in that during the use of the overall matting installation only certain panels 10 are contacted by a landing aircraft and forced to carry a direct load. In other words, the sealed joint system provides the matting with a certain amount of overall resiliency or elasticity which tends to keep the matting panels together while allowing one panel to shift or give relative to another under concentrated aircraft loading or impact so that the matting can readily absorb landing impacts without fracture of the components thereof.

The sealing system proposed herein advantageously compensates for the tendency of a line of mats or panels such as the row A of mats to shift as a unit during use by aircraft relative to another line or row of mats such as the row B of mats in that such shifting of one row of mats relative to another row of mats can take place without a breakage of the seal therebetween due to the manner in which the sealing elements 16 and 32 are arranged relative to each other and to other elements including the various panels used in the matting installation.

Because of the manner in which the sides 45′, shoulder walls 44′ and stop walls 46′ of the heads 40 of strips 32 are matchingly inclined and compressed relative to the inclined wall surfaces 50′ of elements 12, the inclined wall 21 of element 18 and inclined exposed ends 51′ of elements 17, elements 17 and 18 can shift relative to one another in a joint S′ while still remaining in sealing contact with strips 16 and 32.

As noted above, installation of the matting panels 10 to form a complete installation is a relatively simple matter. Disassembly of the overall matting installation or a given panel when damaged by mortar fire, bombing or other enemy action, etc. likewise involves a very simple procedure.

In one advantageous embodiment of the invention, the overall disassembly can be effected simply and in a reverse fashion to the installation procedure aforedescribed by first removing all of the panels in the endmost row at the right. Thus, for example, if we consider row F to be an endmost row, the bars 14 and strips 16 in joints J′ of row F are removed by rolling or pivoting all of the panels 10 in row F upwardly whereby the female members 18 on the panels of row F become disengaged from their cooperating male members 17 in the panels of row E. The same procedure applies to the panels of rows E, D, C, B, etc.

If any given plank 10 in a particular row is damaged and access thereto is required for the purpose of replacing or repairing the same, this can likewise be effected in an expeditious manner. For example, let us assume that panel 3 which can be the third panel in from the bottom in row E is damaged and has to be removed for the purposes of repair. For the purposes of this example, we will further assume that the entire matting installation is made only of panel rows A–F. To gain access to panel 3 in row E, all that is required is for the locking bars 14 and strips 16 in transition joints J′ between panels 2–3, 3–4 and 4–5 to be removed in row F by the use of appropriate tools, if necessary. Panels 3 and 4 in row F are then rotated or pivoted upwardly so as to effect disengagement of the cooperataing male and female connectors 17 and 18 between the panels 3 and 4 of row F and the panels 2, 3 and 4 of row E. After removal of panels 3 and 4 of row F, the strips 16 and bars 14 in the transition joints J′ between panels 2–3 and 3–4 of row E are removed and panel 3 of row E is then pivoted upwardly and thereafter removed by disengaging panel 3 in row E from panels 3 and 4 in row D.

A new panel or the repaired panel 3 of row E would then be put down by being rolled into place with respect to panels 3 and 4 of row D as aforedescribed. The locking bars 14 and sealing strips 16 therefor are next restored in the transition joints J′ between panels 2–3 and 3–4 in row E. Next panels 3 and 4 of row F are restored to their prior position in the manner previously described and transition joint inserts or bars 14 and strips 16 located in the joints J′ between panels 2–3, 3–4 and 4–5 in row F.

By virtue of the aforesaid arrangement an extremely efficient sealing system has been provided for a landing mat installation or the like which does not adversely affect the ready assembly and disassembly of the panels making up such a system.

Although not discussed, it is to be understood that suitable ground anchors well known in the art can be used to anchor the overall matting in place adjacent the peripheral edges thereof if desired.

An advantageous embodiment of the invention has been shown and described. It is obvious that various changes and modifications may be made therein without departing from the scope thereof as defined in the appended claims, wherein:

What is claimed is:

1. In a modular sealed matting system and the like, the combination of a plurality of removably interlocked panels the opposing marginal edges of a pair of said panels each being provided with opposing recesses, a sealing strip of resilient compressible material disposed within and at least partially filling the said recesses of said panels, locking bar means removably disposed in other recesses in the said opposing marginal edges of said pair of panels and releasably engaging the marginal edges of each of said panels of said pair of panels for holding said pair of panels together and cap means drawn about a selected portion of said sealing strip said cap means acting in conjunction with said locking bar means to effect a compression of portions of the sealing strip disposed intermediate said cap means and said locking bar means in said recesses and a sealing of one panel to the other panel in said pair of panels.

2. The matting system as set forth in claim 1 including a wedge-like element affixed to one end of said cap means and engageable with the walls of said recesses.

3. The matting system as set forth in claim 1 including spring-like finger means disposed intermediate the cap means and said sealing strip for engaging and urging selected portions of the sealing strip into contact with the walls of said recesses in the panels.

4. The matting system of claim 1 wherein said strip is provided with wing elements which sealably engage the walls of the recesses in the panels.

5. In a modular sealed matting system and the like the combination of a plurality of removably interlocked panels the opposing marginal edges of a pair of panels being assembled relative to each other and to the marginal edge of a further panel to form an overall joint structure at the point of mergence of said panels, the said opposing marginal edges of said pair of panels each being provided with opposing recesses, a sealing strip of resilient compressible material disposed within and at least partially filling the said recesses in said panels and said overall joint structure, locking bar means releasably engaging the opposing marginal edges of said pair of panels for holding said pair of panels together and cap means drawn about and jacketing selected portions of said sealing strip, said cap means acting in conjunction with said locking bar means for effecting a compression of portions of the said sealing strip disposed intermediate said cap means and said locking bar means in said recesses and said overall joint structure and a sealing of the opposed marginal edges of said pair of panels together.

6. The mating system of claim 5 wherein said strip is provided with wing elements which sealably engage the walls of the recesses in the opposed marginal edges of the pair of panels.

7. The matting system of claim 5 including a separate sealing strip carried by the marginal edge of said further panel and made of a resilient compressible material arranged crosswise to and in sealing engagement with said first sealing strip, portions of said separate sealing strip being disposed intermediate said locking bar means and said first sealing strip in said overall joint structure.

8. In a modular sealed matting system the combination of a plurality of removably interlocked panels, the opposing marginal edges of a pair of panels being assembled relative to a further panel and to each other so as to form an overall pocketed joint structure at the point of mergence of said panels, the said opposing marginal edges of said pair of panels each being provided with opposing recesses, a sealing strip of resilient compressible material disposed within and at least partially filling the recesses in said pair of panels and said pocketed joint structure, locking bar means releasably engaging the opposing marginal edges of said pair of panels for holding said pair of opposed panels together, said sealing strip being provided with wing elements along selected portions thereof and strip cap means along other selected portions thereof said wing elements and said cap means engaging different selected wall portions of the recesses in said pair of panels, said cap means acting in conjunction with said locking bar means to effect a compression of portions of said strip disposed intermediate said locking bar means and said cap means including said wing elements and a sealing engagement of the wing elements of said strip with the wall portions of the recesses in contact therewith.

9. A modular sealed matting system as set forth in claim 8 including a further sealing strip of a resilient compressible material and carried by the marginal edge of said further panel disposed in said pocketed joint structure intermediate said first sealing strip and said locking bar means and arranged at an angle to said first sealing strip.

10. In a modular sealed matting system the combination of a plurality of removably interlocked panels, the opposing marginal edges of a pair of panels being assembled relative to a further panel and to each other so as to form an overall pocketed joint structure at the point of mergence of said panels, the said opposing marginal edges of said pair of panels each being provided with opposing recesses, a sealing strip of resilient compressible material disposed within and at least partially filling the said recesses in said pair of panels and said pocketed joint structure, locking bar means releasably engaging the opposing marginal edges of said pair of panels for holding said pair of opposed panels together, said sealing strip being provided with wing elements and strip cap means which engage selected wall portions of the recesses in said pair of panels, said cap means acting in conjunction with said locking bar means to effect a compression of said strip and a sealing engagement of the wing elements of the strip with the wall portions of the recesses in contact therewith and said sealing strip having a wedge element attached thereto which is at least partially engageable with the walls of the recesses in the opposed pair of panels within which the strip is disposed.

11. A composite sealing strip disposable within a pair of mating recesses in adjoining panels said sealing strip being made of resilient and readily compressible material portions of which comprise wing elements for engaging selected wall portions in each of the recesses in the panels, a metallic cap means jacketed about portions of the sealing strip that are spaced from said wing elements for engaging other selected wall portions of the recesses when the strip is disposed and compressed within said recesses and a wedge element affixed to one end of the metallic cap means for use in compressing the compressible material of the strip when the strip is slidably disposed in said recesses of said adjoining panels.

12. The sealing strip of claim 11 wherein said sealing strip is provided with stop elements for properly positioning said strip within said recesses.

13. In a modular sealed matting system of the type described the combination of a plurality of removably interlocked panels the opposing marginal edges of a pair of panels at a given side of each of said panels in said pair of panels being assembled relative to a third panel and to each other so as to form a first overall joint structure at the point of mergence of said pair of panels and said third panel, the opposing marginal edges of said pair of panels at another given side of each of said panels in said pair of panels being assembled relative to a fourth panel and to each other so as to form a second overall joint structure at the point of mergence of said pair of panels and said fourth panel, the said opposing marginal edges of each panel in said pair of panels being provided with opposing recesses, locking bar means releasably engaging the opposing marginal edges of said pair of panels for holding said pair of panels together, a sealing strip of resilient compressible material disposed within and at least partially filling said recesses in said pair of panels and said first overall joint structure, said sealing strip being provided with cap means which engage selected portions of said sealing strip portions of said cap means projecting into said first overall joint structure, said cap and locking bar means acting in conjunction with each other to effect a compression of portions of said sealing strip disposed intermediate said cap and locking bar means in said recesses and in said first overall joint structure.

14. The sealed matting system of claim 13 wherein said first sealing strip also protrudes partially into said second overall joint structure so as to sealingly contact a further sealing strip means carried by said fourth panel and disposed in said second overall joint structure.

15. The sealed matting system of claim 13 wherein said sealing strip is provided with a stop element for properly positioning said strip in said first overall joint structure and within the recesses in said pair of panels.

16. In a modular sealed matting system of the type described the combination of a plurality of removably interlocked panels the opposing marginal edges of a pair of panels at a given side of each of said panels in said pair of panels being assembled to a third panel and to each other so as to form a first overall joint structure at the point of mergence of said pair of panels and said third panel, and the opposing marginal edges of said pair of panels at another given side of each of said panels in said pair of panels being assembled relative to a fourth panel and to each other so as to form a second overall joint structure at the point of mergence of said pair of panels and said fourth panel, the said opposing marginal edges of each panel in said pair of panels being provided with opposing recesses, locking bar means releasably engaging the opposing marginal edges of said pair of panels for holding said pair of panels together, a sealing strip of resilient compressible material disposed within and at least partially filling said recesses in said pair of panels and said first overall joint structure, said sealing strip being provided with cap means portions of which project into said first overall joint structure, said cap and locking bar means acting in conjunction with each other to effect a compression of said sealing strip in said recesses and in said first overall joint structure and additional sealing strip means of resilient compressible material disposed in said first overall joint structure intermediate said first sealing strip and said locking bar means and crosswise to said first sealing strip, said first sealing strip and additional sealing strip means acting to inhibit the penetration of water through said first overall joint structure.

17. The sealed matting system of claim 16 wherein said sealing strip means has enlarged head portions which fit within said first overall joint structure and which match the configuration of selected portions of the panels that abuttingly contact said last mentioned head portions of the sealing strip means.

18. In a modular sealed matting system of the type described the combination of a plurality of removably interlocked panels the opposing marginal edges of a pair of panels at a given side of each of said panels in said pair of panels being assembled relative to a third panel and to each other so as to form a first overall joint structure at the point of mergence of said pair of panels and said third panel and the opposing marginal edges of said pair of panels at another given side of each of said panels in said pair of panels being assembled relative to a fourth panel and to each other so as to form a second overall joint structure at the point of mergence of said pair of panels and said fourth panel, the opposing marginal edges of each panel in said pair of panels being provided with opposing recesses, locking bar means releasably engaging the opposing marginal edges of said pair of panels for holding said pair of panels together, a sealing strip of resilient compressible material disposed within and at least partially filling said recesses in said pair of panels and said first overall joint structure, said sealing strip being provided with cap means portions of which project into said first overall joint structure, said cap and locking bar means acting in conjunction with each other to effect a compression of said sealing strip in said recesses and in said first overall joint structure and said sealing strip being provided with wing elements for engaging the walls of the recesses and spring-like finger elements disposed in said recesses for contacting and urging said wing elements into contact with the wall portions of the recesses associated therewith.

19. In a modular sealed landing mat system the combination of a plurality of removably interlocked panels, the opposing marginal edges of a pair of panels certain ends of which are cutout being assembled relative to the full marginal edge of another panel and to each other so as to form an overall pocketed joint structure at the point of mergence of said panels, the said opposing marginal edges of said pair of panels each being provided with opposing recesses, a sealing strip of resilient compressible material disposed within and at least partially filling said recesses in said pair of panels and said pocketed joint structure, locking bar means releasably engaging the opposed marginal edges of said pair of panels and partially projecting into said pocketed joint structure and strip cap means disposed within the said recesses and said pocketed joint structure, said cap means acting in conjunction with the sealing strip and a further seal strip means carried by said third panel and disposed in said pocketed joint structure to seal said joint structure against water penetration.

20. A method of installing landing mat panels and the like comprising the steps of disposing the marginal edges of a pair of panels provided with pairs of opposing recesses in adjoining relation to each other such that the respective recesses of each pair of recesses in the panels are in registry with each other, selecting a composite sealing strip comprised partly of a resilient compressible element and partly of a rigid element and inserting said sealing strip within one pair of registered recesses in the panels, sliding the inserted sealing strip along said one pair of registered recesses until portions of the strip protrude from each of the opposed ends of the one pair of registered recesses, thereafter inserting a locking bar within the other pair of registered recesses in said panels and sliding said locking bar along said second pair of recesses until one end of said bar protrudes from at least one end of each of the said second pair of recesses, then arranging a third panel the structure of which is similar to that of the panels of said pair of panels in offset relation to each of the first mentioned panels and effecting an interlocking of said third panel with each panel in said pair of panels, and while interlocking said third panel to each panel of said pair of panels effecting a compression of the inserted sealing strip and other sealing strips carried by the panels of said pair of panels against the third panel and against each other in the areas of joindure of all of said panels.

21. The method as set forth in claim 20 including the step of compressing the end of the inserted sealing strip that is remote from the third panel against a sealing strip carried by a previously installed panel of like configuration.

22. The method as set forth in claim 20 including the step of pivoting a portion of said third panel simultaneously about selected portions of each panel of said pair of panels to effect an interlocking of all of said panels together.

23. A method of installing landing mat panels and the like comprising the steps of disposing the marginal edges of a pair of panels provided with pairs of opposing recesses in adjoining relation to each other such that the respective recesses of each pair of recesses in the panels are in registry with each other, selecting a composite sealing strip comprised partly of a resilient compressible element and partly of a rigid element and inserting said sealing strip within one pair of registered recesses in the panels, sliding the inserted sealing strip along said one pair of registered recesses until portions of the strip protrude from each of the opposed ends of the one pair of registered recesses, thereafter inserting a locking bar within the other pair of registered recesses in said panels and sliding said locking bar along said second pair of recesses until one end of said bar protrudes from at least one end of each of the said second pair of recesses, then arranging a third panel the structure of which is similar to that of the panels of said pair of panels in offset relation to each of the first mentioned panels and effecting an interlocking of said third panel with each panel in said pair of panels, and while interlocking said third panel to each panel of said pair of panels effecting a compression of the inserted sealing strip and another sealing strip carried by one of the panels against the third panel and each panel of said pair of panels in the areas of joindure of all of said panels.

References Cited

UNITED STATES PATENTS

| | | | |
|---|---|---|---|
| 2,786,556 | 3/1957 | Constance | 52—588 |
| 2,960,195 | 11/1960 | Toth | 52—403 |
| 3,276,334 | 10/1966 | Rhodes | 94—18 |
| 3,308,726 | 3/1967 | Dreher | 94—18 |
| 3,348,459 | 10/1967 | Harvey | 94—13 |
| 3,455,215 | 7/1969 | Webb | 94—18 |

JACOB L. NACKENOFF, Primary Examiner

U.S. Cl. X.R.

52—586